UNITED STATES PATENT OFFICE.

J. M. MERRICK, JR., OF BOSTON, MASSACHUSETTS, ASSIGNOR TO NEW ENGLAND VULCANITE HIDE COMPANY.

IMPROVED MATERIAL FOR THE MANUFACTURE OF BOXES, PICTURE-FRAMES, BUTTONS, INSULATORS, INKSTANDS, AND OTHER ARTICLES.

Specification forming part of Letters Patent No. 85,018, dated December 15, 1868.

*To all whom it may concern:*

Be it known that I, JOHN MUDGE MERRICK, Jr., of Boston, in the county of Suffolk and State of Massachusetts, have invented a new Composition of Matter for the Ceramic Arts; and I do hereby declare that the following is a full and exact description thereof.

The nature of my invention consists in combining finely-powdered silica, either chemically prepared or occurring in nature in the form of diatomaceous deposits or infusorial earth, with the gum-shellac of commerce or similar gums, and thus producing an entirely new material for the ceramic arts, which may be molded or compressed by suitable devices into useful and ornamental articles—such as buttons, boxes, inkstands, card and photograph cases, picture-frames, and other articles now molded from compounds with india-rubber.

Being practically engaged in the manufacture of articles like those above mentioned from materials intended as substitutes for compounds with india-rubber—such as rawhide, sulphur, gum-shellac, and sawdust—it has been my object to obtain a material which, preserving its plastic character, should have greater compactness, hardness, and surface-polish than materials heretofore used for the purposes above mentioned. I have discovered that I can accomplish the desired object by combining with the gum-shellac, or similar gums, silica in a state of fine division, such as occurs in silica chemically prepared or existing in nature in the form of diatomaceous deposits or infusorial earth, the latter being found preferable. The addition of the finely-divided silica to the gum-shellac or similar gums, in the manner hereinafter described, gives a material of great hardness and compactness, having, when molded, great smoothness and luster of surface and capable of receiving any color.

The process which I adopt, but which I do not claim as new, except in its application to the special material which I use, is as follows: Prepared silica in the utmost possible state of division which can be attained, or, what I prefer, the siliceous earth known as "diatomaceous" or "infusorial" deposits, naturally in a state of great division, is mixed with gum-shellac in a dry state, or any other similar gum in equal proportions, by weight. The mixed material is brought to a semi-plastic state through heat applied to it by means of a steam-stove. The material is then taken out and passed between steam-rollers, such as are used in rolling india-rubber. It is passed repeatedly through these rollers until the two ingredients are preferably incorporated. The compound, while still hot, is passed through other cold rollers, somewhat similar to those used by confectioners, to give the rough shape to the object to be molded. The shapes are then rewarmed and placed in steam or metallic dyes which have been previously warmed. The material in a rough shape is then subjected to strong pressure in these dyes. The pressed material when it issues from these dyes has a smooth surface and high luster and the required strength and hardness.

What I claim as my invention is—

1. The new material for being molded into useful or ornamental forms, consisting of a combination of a powder of silica chemically prepared or occurring in the form of diatomaceous deposits or infusorial earth with gum-shellac or other similar gums.

2. The molding of the aforesaid material into useful or ornamental articles by rollers and dyes, substantially in the manner above described.

J. M. MERRICK, JR.

Witnesses:
JOHN L. HAYES,
BYRON ROSE.